March 10, 1925.
S. P. LYON
1,528,933
KITE FOR AERIAL CAMERAS
Filed April 10, 1922
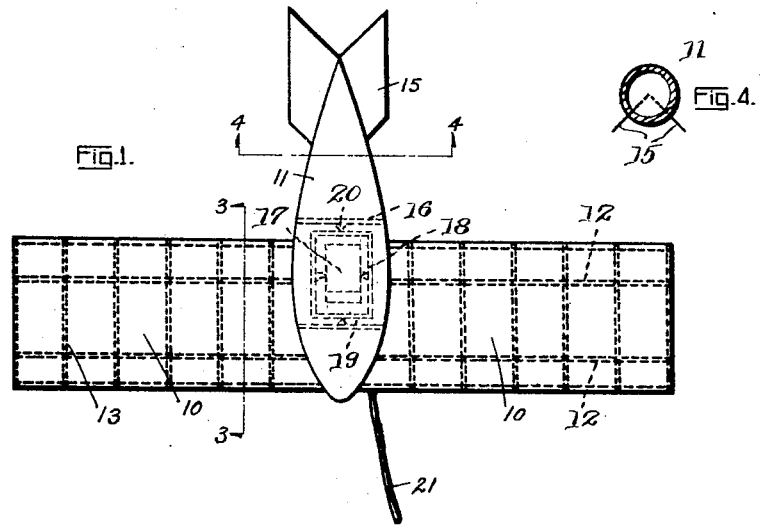
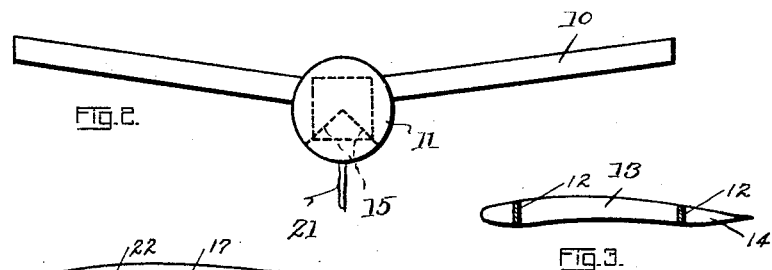
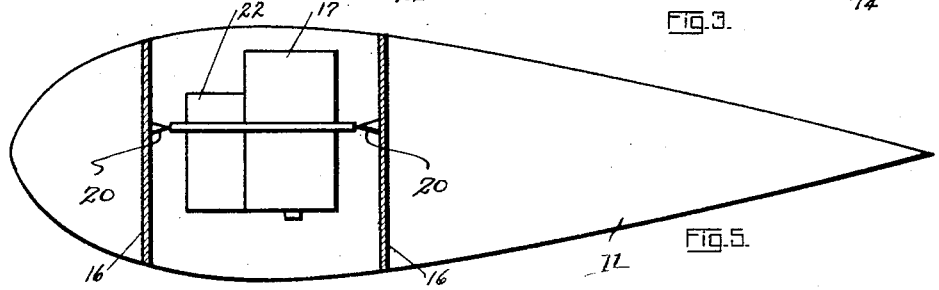
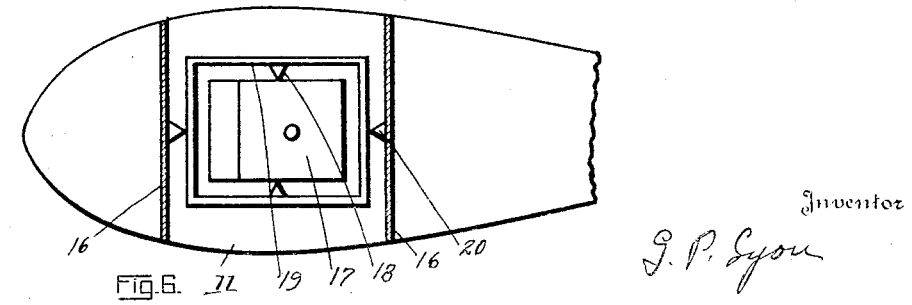
Inventor
S. P. Lyon
By Robert H. Young
Attorney Patented Mar. 10, 1925.

1,528,933

UNITED STATES PATENT OFFICE.

SIDNEY P. LYON, OF TIPPECANOE CITY, OHIO.

KITE FOR AERIAL CAMERAS.

Application filed April 10, 1922. Serial No. 551,355.

*To all whom it may concern:*

Be it known that I, SIDNEY P. LYON, a citizen of the United States, residing at Tippecanoe City, in the county of Miami and State of Ohio, have invented certain new and useful Improvements in Kites for Aerial Cameras, of which the following is a specification.

This invention relates to a kite adapted to support an aerial camera.

An object of the invention is to provide a kite having inherent longitudinal and lateral stability so that the movements thereof from an even keel will be slight and insufficient to give the camera a pendulum oscillation of any amplitude worthy of consideration.

A further object of the invention is to provide a camera mount which serves to reinforce the fuselage of the kite.

My invention also aims to supply an apparatus which can be cheaply constructed and still may be relied upon to furnish satisfactory close range photographs.

The invention is particularly useful in taking photographs near the lines of the enemy without endangering personnel, also for snapping and locating important points otherwise inaccessible, and for pictures of forest fires when an airplane is not available.

Other objects of the invention consisting of novel features of construction and arrangements of parts will become apparent as the description proceeds. The invention is hereinafter described in connection with the accompanying drawings, in which:—

Figure 1 is a plan view of a kite embodying my invention.

Figure 2 is a front elevation.

Figure 3 is a sectional view on the line line 3—3 of Figure 1.

Figure 4 is a sectional view on the line 4—4 of Figure 1.

Figure 5 is a side elevation of the fuselage with parts broken away to disclose the camera and camera mount.

Figure 6 is a plan view of the fuselage with parts broken away.

The numeral 10 designates the wings which project from opposite sides of the fuselage 11 and are arranged at a dihedral angle of approximately four degrees. The wings have the spars 12 and ribs 13 and are otherwise similar in construction to standard aerofoils with the exception that the trailing edge 14 is inclined upward thereby giving a longitudinal stabilizing effect. Further longitudinal as well as directional stability is afforded by two fixed fins 15 extending downwardly from the rear of the fuselage so as to form a cathedral angle. These fins act as a rudder and dampening stabilizer.

The fuselage 11 is of streamline shape and is provided with spaced vertical walls or bulkheads 16 passing therethrough. These walls connect openings in the top and bottom of the fuselage and form a compartment in which a camera 17 is mounted. The camera 17 is mounted on pivots 18 secured to a gimbal frame 19 which is, in turn, mounted on pivots 20 supported by the walls 16. The axes of the pivots 18 and 20 are arranged at right angles so that the camera is free to assume a vertical position irrespective of the position of the kite. However, as described above, the kite is very stable and will move only slightly in any direction with a gradual movement owing to the dampening effect of the fins 15 and upwardly inclined trailing edges 14. A cable 21 leads from the center of gravity of the kite to a windlass (not shown) on the ground.

Clock mechanism housed in a casing 2 attached to the camera automatically controls the functioning of the shutter and film of the camera. This clock mechanism may be of any suitable form but a system similar to the repeater alarm mechanism is preferred, whereby the film is exposed and rolled for the next picture at regular intervals.

The stability of the kite aids in maintaining the camera in vertical position but as a further precaution the center of gravity of the camera and clock mechanism is low in relation to the plane of support so that there is no tendency toward rapid oscillations of the camera after the manner of a pendulum.

As a result, clear distinct pictures can be obtained as the external optical axis of the camera is maintained vertical.

I claim:—

1. An aerial support for photographic cameras consisting of a captive kite of airplane structural formation but having normally fixed stabilizing surfaces, and a gimbal ring camera mount carried by said kite.

2. The combination with a kite having a fuselage, spaced walls passing through the fuselage and forming a compartment therein and means for maintaining lateral, longitudinal and directional stability, of a gimbal frame pivotally mounted on said walls, and a camera supported by said frame.

In testimony whereof I affix my signature.

SIDNEY P. LYON.